United States Patent
Seymour

(10) Patent No.: US 9,154,636 B2
(45) Date of Patent: Oct. 6, 2015

(54) SYSTEM AND METHOD FOR EMERGENCY REPORTING

(75) Inventor: Shafer Seymour, Bartlett, IL (US)

(73) Assignee: Continental Automotive Systems, Inc, Auburn Hills, MI (US)

( * ) Notice: Subject to any disclaimer, the term of this patent is extended or adjusted under 35 U.S.C. 154(b) by 565 days.

(21) Appl. No.: 12/338,126

(22) Filed: Dec. 18, 2008

(65) Prior Publication Data

US 2010/0159868 A1 Jun. 24, 2010

(51) Int. Cl.
- H04W 4/22 (2009.01)
- H04M 11/04 (2006.01)
- G08B 25/00 (2006.01)
- G08B 25/01 (2006.01)
- H04M 1/725 (2006.01)
- H04W 76/00 (2009.01)

(52) U.S. Cl.
CPC ............. *H04M 11/04* (2013.01); *G08B 25/004* (2013.01); *G08B 25/016* (2013.01); *H04M 1/72536* (2013.01); *H04W 4/22* (2013.01); *H04W 76/007* (2013.01)

(58) Field of Classification Search
CPC .................. H04W 76/007; H04M 2242/04
USPC .............................................. 455/404.1, 564
See application file for complete search history.

(56) References Cited

U.S. PATENT DOCUMENTS

| | | | |
|---|---|---|---|
| 5,465,388 A * | 11/1995 | Zicker | 455/404.1 |
| 7,844,271 B2 * | 11/2010 | Rouffet et al. | 455/436 |
| 8,395,498 B2 * | 3/2013 | Gaskill et al. | 340/539.12 |
| 2003/0069019 A1 * | 4/2003 | Schwinke | 455/445 |
| 2004/0192370 A1 * | 9/2004 | Backes et al. | 455/522 |
| 2006/0003809 A1 * | 1/2006 | Boling et al. | 455/564 |
| 2006/0025141 A1 * | 2/2006 | Marsh et al. | 455/445 |
| 2006/0095199 A1 | 5/2006 | Lagassey | |
| 2006/0099993 A1 * | 5/2006 | Leinonen et al. | 455/562.1 |
| 2008/0001733 A1 * | 1/2008 | Pinder | 340/539.18 |
| 2008/0009262 A1 * | 1/2008 | Rudolf et al. | 455/404.1 |
| 2008/0214231 A1 * | 9/2008 | Leedom | 455/552.1 |
| 2009/0063193 A1 * | 3/2009 | Barton et al. | 705/3 |
| 2009/0098850 A1 * | 4/2009 | Deaton et al. | 455/404.1 |
| 2009/0143078 A1 * | 6/2009 | Tu et al. | 455/456.3 |
| 2009/0264094 A1 * | 10/2009 | Smith | 455/404.2 |
| 2011/0098877 A1 * | 4/2011 | Stahlin et al. | 701/33 |

FOREIGN PATENT DOCUMENTS

| | | |
|---|---|---|
| CN | 1209233 A | 2/1999 |
| CN | 1237048 A | 12/1999 |
| CN | 1578521 A | 2/2005 |
| CN | 1695395 A | 11/2005 |
| CN | 101189897 A | 5/2008 |

* cited by examiner

*Primary Examiner* — Khalid Shaheed
*Assistant Examiner* — Frank Donado

(57) ABSTRACT

A determination is made as to whether a first channel is communicatively coupled to a communication network. The first communication channel is configured to preferentially transmit emergency messages to the communication network. When the first communication channel is not communicatively coupled to the communication network, a second communication channel and at least one configuration parameter to configure the second communication channel are determined. The second communication channel is configured with the determined at least one parameter. An emergency message is transmitted over the configured second communication channel.

7 Claims, 3 Drawing Sheets

SYSTEM AND METHOD FOR EMERGENCY REPORTING

FIELD OF THE INVENTION

The field of the invention relates to emergency reporting systems and providing backup communication channels in such systems.

BACKGROUND

Various types of emergencies or other types of occasions that require some type of assistance may occur when operating a motor vehicle. For example, the vehicle may be involved in an accident, the vehicle may run out of gas, a mechanical breakdown may occur, or the driver may become lost or otherwise disoriented to mention just a few examples. In such situations, it becomes desirable to summon assistance from the authorities, a family member, or some business (e.g., a towing service), to name a few examples.

Cellular telephone or other types of wireless devices have been used where the driver can make a call and summon the appropriate assistance. Unfortunately, with these types of approaches, the ability of the driver to make the call or contact is presumed. In other words, if the driver becomes disabled, injured, or is otherwise unable to make the call, no assistance can be obtained. In addition, there may be areas where cellular communication coverage is inadequate or non-existent thereby making it impossible to request assistance by that method. Other communication methods may exhibit similar location-sensitive impairments.

In other previous approaches, an emergency communication system is integrated with the car. In these approaches, if a sensor detects that the car has become involved in an accident or is otherwise in need of assistance, then the system automatically contacts a call center. Once the call center has been contacted, personnel at the call center can request emergency assistance and dispatch this assistance to the vehicle.

Unfortunately, these previous call center emergency assistance approaches suffer from several disadvantages. For example, the emergency system may utilize a particular communication technology, which may become unusable at the location where the assistance is needed. In these situations, the emergency system is unable to communicate with the call center and the emergency assistance is never sent. This causes user inconvenience at a minimum and can also risk the life and/or safety of the user in many circumstances.

Figure 1:
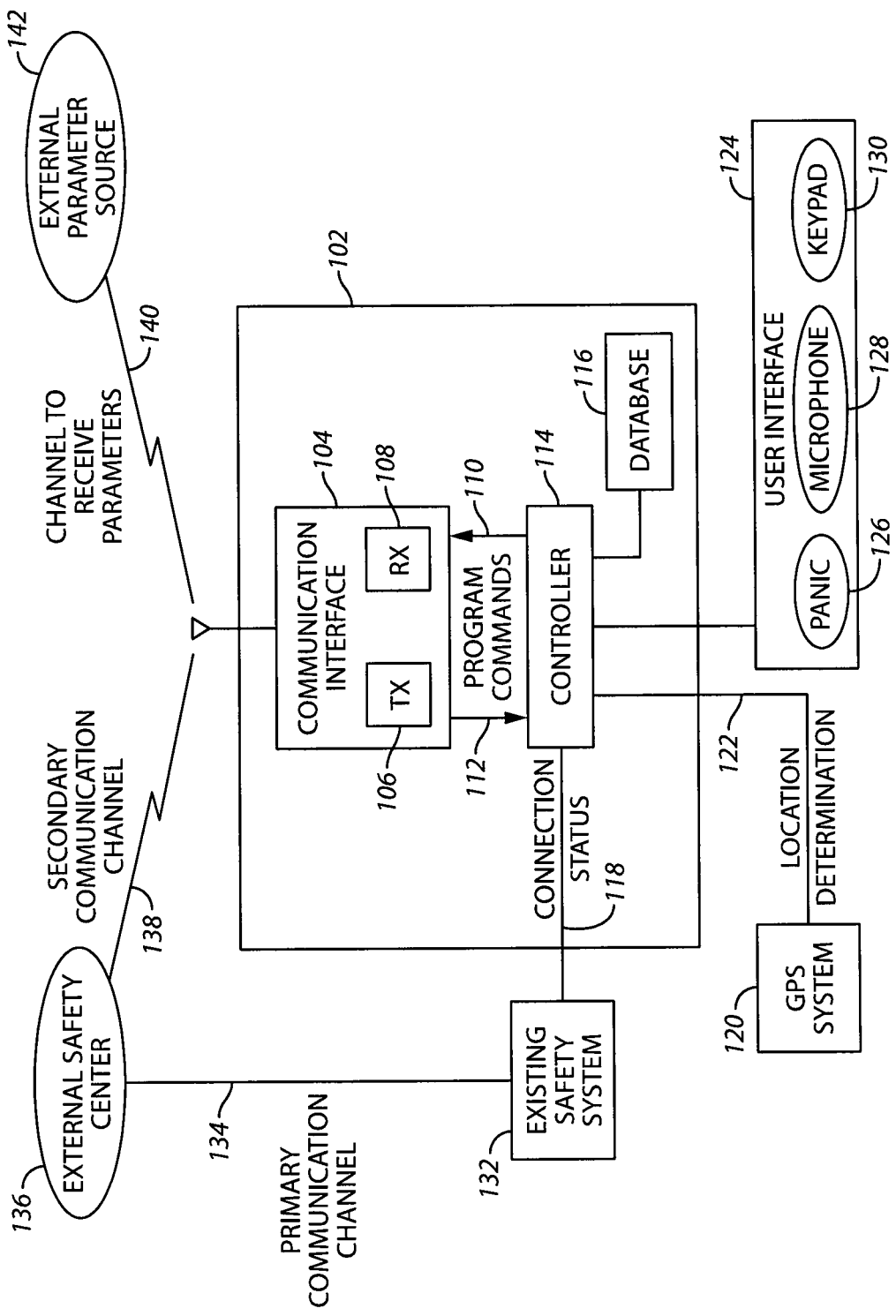
FIG. 1 comprises a block diagram of an emergency assistance system according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches for obtaining emergency assistance, for example, for a user that is present in, and operating, a vehicle are provided. These approaches allow emergency assistance to be obtained for the user when the standard communication environment of the vehicle is unavailable, but non-standard (for this vehicle) communication channels are available. These approaches are self-configurable and act to automatically configure a transmitter associated with the user to an appropriate communicate channel in order to obtain appropriate emergency assistance. In addition, these approaches are easy to use and increase the ability of the user to obtain emergency assistance in a wider array of communication environments.

In many of these embodiments, a determination is made as to whether a first communication channel is communicatively coupled to a communication network, for example, a communication network linked to an emergency call or safety center. The first communication channel is configured to preferentially transmit emergency messages to the communication network, for instance, over the communication network to the emergency call center. When the first commercial channel is not communicatively coupled to the communication network, a second communication channel and at least one configuration parameter that is used to configure the second communication channel are determined. The second communication channel is configured with the determined parameter and the secondary communication channel is coupled to the same (or a different) communication network. An emergency message is then transmitted over the configured second communication channel over the same or different communication network, for example, to an emergency call center. Once the message is received at the emergency call center, appropriate assistance may be sent to a user that has sent the message.

In some examples, a receiver is configured to receive the parameter from a source. The source may include a number of different sources that are themselves different types of communication channels. For example, the source may be a television communication channel, a radio communication channel, or a cellular communication channel. Other examples of sources are possible.

In other examples, the second communication channel may be selected from amongst a plurality of second communication channels according to predetermined criteria. In some approaches, the predetermined criteria utilize an automatic selection process while in other approaches the predetermined criteria utilize a dynamic selection process. For example, the identity of the second channel may be stored in a memory location and automatically retrieved when needed. In an example of a dynamic process, different input conditions (e.g., signal strength, location) may be used to determine the identity of the second communication channel.

In still other examples, the second communication channel may be determined by automatically determining a source of the parameters. An attempt may be made to obtain the parameters from the source and when the parameters can not be obtained from the source, a second source may be determined from amongst a plurality of possible second sources. For example, if a first radio channel is first used to obtain the parameters, but the first radio channel is unavailable (e.g., due to interference), a second radio channel may be used to obtain the parameters. The order of selection may be specified in a list that is stored in any appropriate data structure in any appropriate memory device.

Thus, approaches for obtaining emergency assistance, for example, for a user operating a vehicle are provided. These approaches allow emergency assistance to be obtained regardless of the communication environment of the vehicle. The approaches described herein are self-configurable and automatically configure a transmitter to an appropriate communicate channel to use in order to obtain emergency assistance. In addition, these approaches are easy to use and increase the ability of the user to obtain emergency assistance regardless of the communication environment.

The approaches described herein are described with respect to vehicles and, more specifically, to users obtaining assistance from these vehicles (e.g., cars, trucks, and the like). However, it will be appreciated that these approaches are also applicable for other environments besides vehicles such as aircraft, ships, homes, businesses, or any other location where a user could need or potentially need assistance. In addition, although the examples described herein are described with respect to obtaining emergency assistance, it will be appreciated that these approaches are applicable to obtaining any type of assistance such as instructions or the like (e.g., operating instructions for a vehicle or appliance), when an emergency does not exist.

Turning now to the figures and referring now to FIG. 1, one example of a safety apparatus and its use in a safety system is described. A safety apparatus 102 includes a communication interface 104, a controller 114, and a database 116.

The communication interface 104 includes a transmitter 106 and a receiver 108. The communication interface 104 is coupled to the controller 114 via program lines 110 and lines 112. The transmitter 106 is any type of transmitting communication device. In this regard, the transmitter 106 is configurable to transmit messages or signals over one or more communication channels according to different transmission parameters. For example, the transmitter 106 may be configurable to transmit over a variety of cellular phone communication channels at different frequencies.

The receiver 108 is any type of communication device that can receive various types of communication signals. In this regard, the receiver 108 is configurable to receive communications over one or more communication channels according to different parameters. For example, the receiver 108 may be configurable to receive communications over a variety of cellular phone communication channels at different frequencies.

In one approach, the transmitter 106 and receiver 108 operate using different types of communication channels. For example, the receiver 108 may receive communications over a television communication channel while the transmitter 106 transmits communications via a cellular communication channel. In another approach, the transmitter 106 and the receiver 108 operate using the same type of communication channels, but according to different parameters. For instance, the receiver 108 receives communications over a first cellular communication channel at a first frequency while the transmitter 106 transmits communications over a second cellular communication channel according to a second frequency. In still another approach, the transmitter 106 and receiver 108 may operate over the same type of communication channel and/or according to the same parameters (e.g., at the same frequency).

The database 116 is coupled to the controller 114. The database 116 may be any type of memory device. For example, the database 116 may be a random access memory (RAM), read only memory (ROM) just to name a few examples.

A user interface 124 is coupled to the controller 114 of the safety apparatus 102. The user interface 124 includes a panic button 126, a microphone 128, and a keypad 130. Any combination of these elements may be used on the interface 124 and other examples of input devices are possible. The user interface 124 includes any combination of computer hardware and/or software to accept inputs from these elements and communicate with the controller 114.

The panic button 126 allows a user to indicate an emergency in one action (e.g., one push of the button). By pushing this button, the user desires to summon assistance immediately. The microphone 128 allows a user to enter voice commands. For example, the user can summon assistance when their hands are occupied when operating the vehicle by using the microphone 128. The keypad 130 allows the user to enter textual information. For example, the user can type a message on the keypad 130 (e.g., requesting assistance and/or including other types of information) that is to be sent to an emergency assistance center.

A Global Positioning Satellite (GPS) system component provides a location determination signal 122 to the controller 114. The location determination signal 122 indicates information that represents the position of the safety device 102 and/or the vehicle or other element where the safety apparatus 102 is located. Alternatively, other types of components may supply location information to the controller 114. For instance, a wheel pulse generation device may provide information indicative of vehicle location, movement, and/or vehicle direction.

An existing safety system 132 is coupled to the controller 114 via a connection status line 118. The connection status line 118 indicates whether the existing safety system is presently connected to an external safety center 136 via a primary communication channel 134. This safety system may be a commercially available OnStar system, to give one example.

The external safety center 136 may be a manual, automated, or combination of a manual or an automated center that responds to emergency messages received. For example, when received personnel at the external safety center 136 may dispatch emergency personnel to the location of the vehicle where the existing safety system 132 (and the user) is located.

The communication interface 104 communicates with the external safety center 136 via a secondary communication channel 138. As described elsewhere herein, the secondary communication channel 138 is utilized when the primary communication channel 134 is unavailable.

The communication interface 104 communicates with an external parameter source 142 via a channel 140 to receive parameters. The parameters so received may be used to allow the communication interface 104 to configure the secondary communication channel 138 and communicate with the external safety center 136.

In one example of the operation of the system of FIG. 1, a determination is made as to whether the primary communication channel 134 is communicatively coupled to the existing safety system 132, some other communication network, or some device coupled to a communication network. The primary communication channel 134 is configured to preferentially transmit emergency messages to the existing safety center 136. When the primary communication channel 134 is not communicatively coupled to the external safety center 136, a secondary communication channel 138 and at least one configuration parameter to configure the secondary communication channel 138 are determined. The secondary communication channel 138 is configured with the determined parameters. An emergency message is transmitted over the now-configured secondary communication channel 138.

In some examples, the receiver 108 is configured to receive the parameters from the external parameter source 142. The external parameter source 142 may be a communication channel, communication device, or combination of communication channels and communication devices. For example, the external parameter source 142 may be a television communication channel, a radio communication channel, or a cellular communication channel. Other examples of external parameter sources are possible.

In other examples of the operation of the system of FIG. 1, the secondary communication channel 138 may be selected from amongst a plurality of secondary channels according to predetermined criteria. In some approaches the predetermined criteria are chosen from an automatic selection process while in other approaches the predetermined criteria are selected from a dynamic selection process.

In still other examples, the secondary communication channel 138 may be determined by automatically determining a source of the parameters. The parameters may be obtained from the source and when the parameters can not be obtained from the source, a second source is determined and chosen from amongst a plurality of potential second sources.

Figure 2:
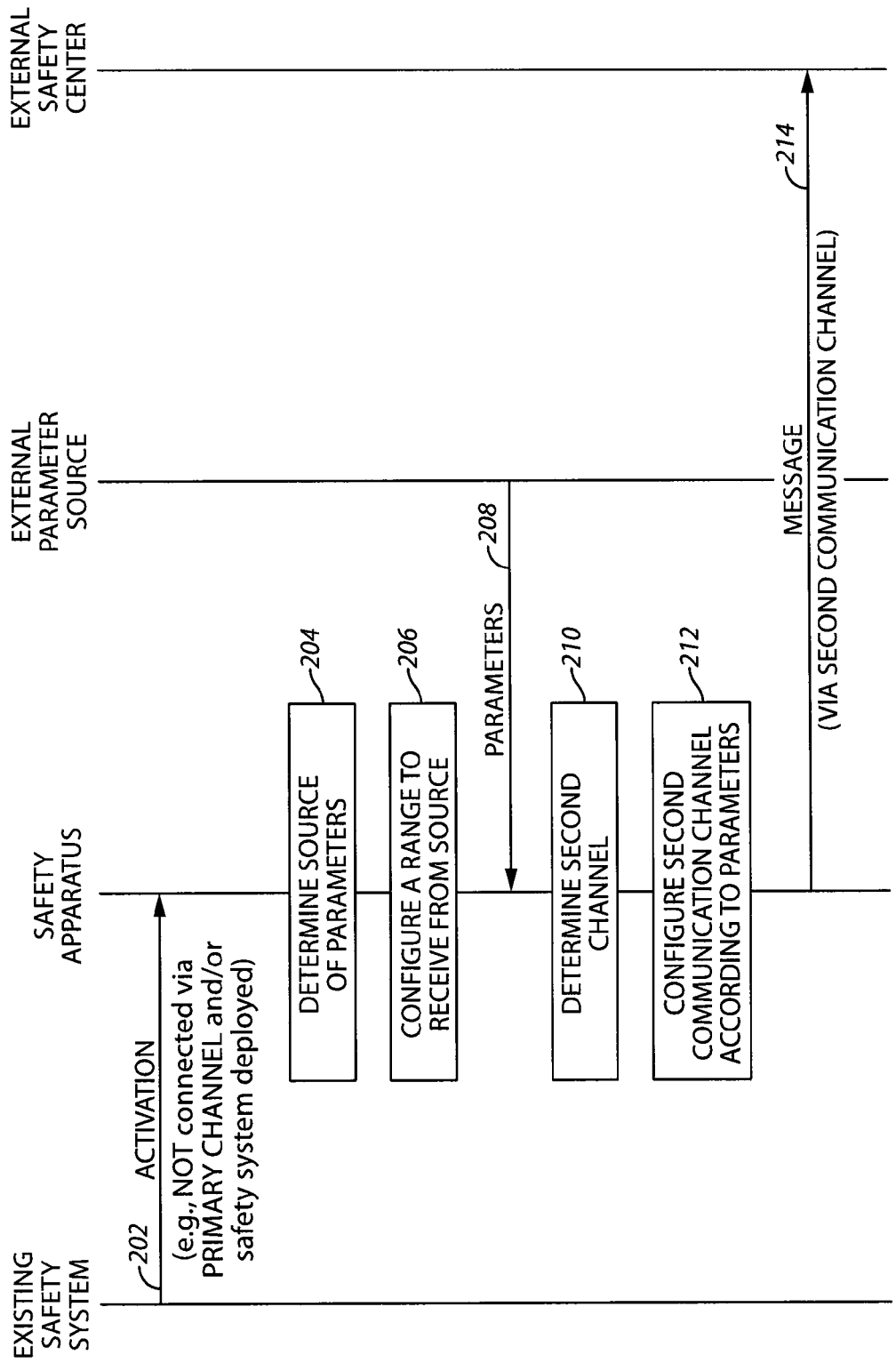
FIG. 2 comprises a call flow diagram of the operation of an emergency assistance system according to various embodiments of the present invention.

Referring now to FIG. 2, one example of the operation of an emergency reporting system is described. In this example, a safety apparatus may be positioned at a vehicle or some other location (e.g., a ship, aircraft, or at a home). The safety apparatus communicates with an external safety center via a primary communication channel and, under some circumstances, via a secondary communication channel and utilizes a transmitter and receiver to perform these functions.

At step 202, an activation signal or message is sent from an existing safety system to a safety apparatus. The activation signal may, for example, indicate that the existing safety system is not connected to an external safety center via a primary communication channel. In another example, the activation signal indicates that the safety system on a vehicle has been deployed. Other examples of activation signals are possible.

At step 204, the safety apparatus determines a source from which it will attempt to obtain parameters. For example, a look up table in memory may be used to indicate that the parameters are to be received from a source via a radio frequency (RF) channel having a particular frequency. In another example, the look up table may indicate that a television channel may be the communication channel from which the parameters are supplied and the receiver may be configured to receive these parameters via the television channel.

At step 206, the safety apparatus is configured to receive the parameters from the external parameter source. For example, if an RF channel of a particular frequency is to be used to receive the parameters, then a receiver at the safety apparatus may be configured to receive the parameters at that particular frequency. In another example, if a television channel is used to obtain the parameters, then the receiver is configured to receive the parameters via the television channel.

At step 208, the parameters are sent from the external parameter source to the safety apparatus via the communication channel that was configured at step 206. For example, the configuration parameters may be received according to a RF channel at the receiver according to a particular frequency. Some examples of these parameters include frequency, power, modulation type, data encoding, and data rate. Other parameters may also be obtained.

Once the parameters are received, at step 210 the safety apparatus determines the identity of a second communication channel to make the emergency communication or transmit the emergency message. The second communication channel may be the same channel or a different channel than the channel from which the parameters have been obtained.

At step 212, the second communication channel is configured according to the received parameters to send the message to the external safety sensors. More specifically, a transmitter is configured from which the messages are to be sent. For example, if the parameters obtained include frequency and modulation scheme, then the transmitter can be configured to transmit according to these parameters.

At step 214, a message is sent via the second communication channel from the transmitter of the safety apparatus to the external safety center. The external safety center (and/or personnel at the external safety center) can perform several actions when the message is received. For example, receipt of the message can trigger an alert to personnel at the safety center and the personnel can initiate aid or assistance to be sent to the location of the safety apparatus. In another example, automatic actions can be taken, for example, police or other emergency authorities can be automatically informed of the receipt of the message from the vehicle and aid can be sent to the location of the safety apparatus. Other examples are possible.

Figure 3:
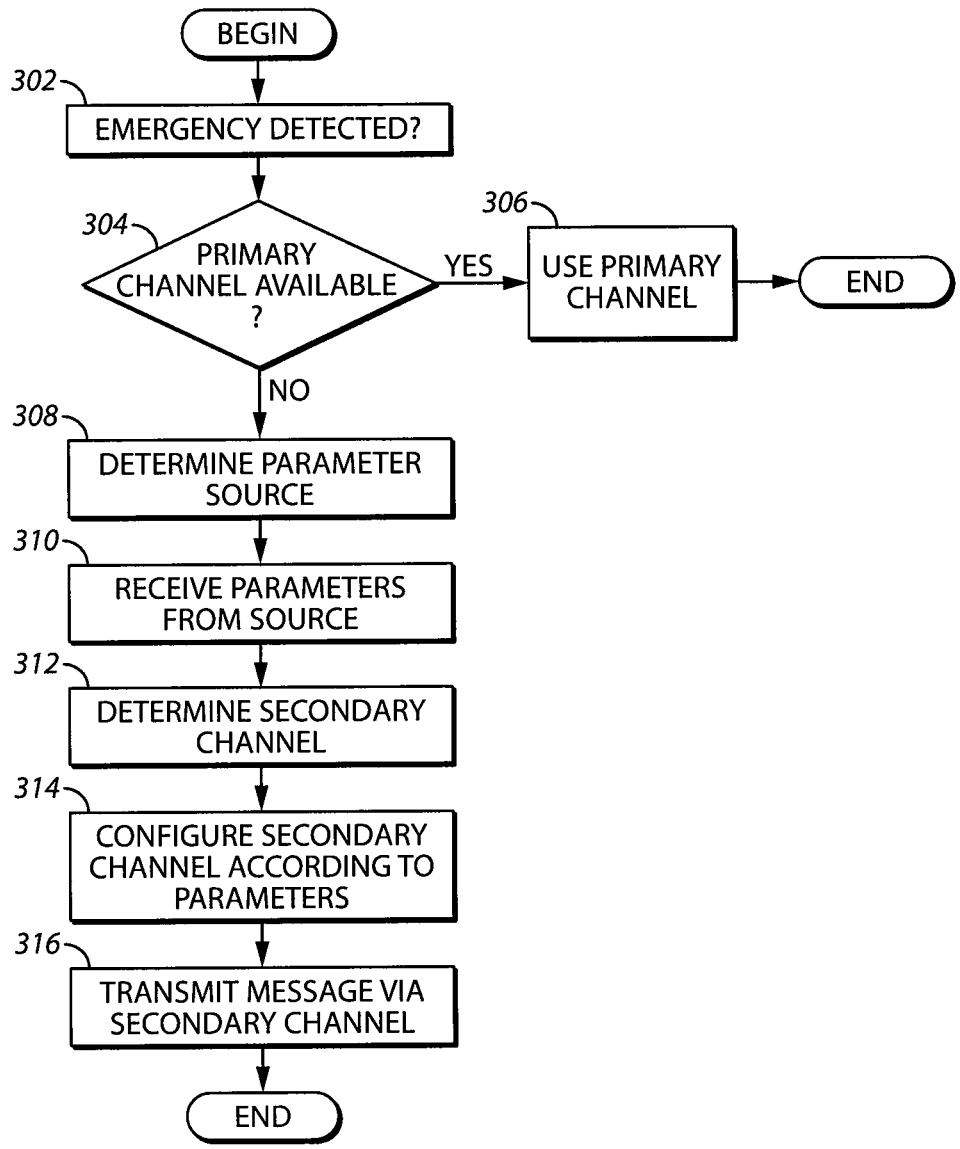
FIG. 3 comprises a flow chart of the operation of an emergency assistance system according to various embodiments of the present invention.

Referring now to FIG. 3, another example of the operation of a safety system is described. In this example as with the example of FIG. 2, a safety apparatus may be positioned at a vehicle or other locations (e.g., a ship, aircraft, or at home). The safety apparatus communicates with an external safety center via a primary communication channel and, under some circumstances, via a secondary communication channel.

At step 302, an emergency (or other situation indicating a user may require assistance) is detected at the vehicle. For example, an airbag may be deployed or a sensor may otherwise indicate that a vehicle has been involved in a crash. In still another example, a user may press the panic button of the vehicle, send an emergency voice message, or enter text to send in an emergency message via a keypad. Other examples of emergency detection approaches and indications are possible.

At step 304, it is determined if a primary communication channel is available. If the answer is affirmative, at step 306, the primary communication channel is used to make the communication with the external safety center (or some other entity).

If the answer at step 304 is negative, then at step 308 a source from which to receive parameters that are to be used to configure a secondary communication channel is determined. For example, a memory within a safety apparatus may be read to indicate the source to be used from which to receive the parameters. In still another example, an ordered list of sources (from which to obtain parameters) may be maintained and the source selected from the list. In some examples, if the first choice on the list is unavailable, then the second choice may be selected and so forth. Once the source is identified, the receiver at the apparatus may be properly configured (e.g., to receive the selected type of source according to the correct frequency).

At step 310, the parameters are received from the source. For example, the parameters may indicate frequency, modulation scheme, data encoding, data rate, to name a few possibilities.

At step 312, a secondary communication channel is determined. For example, the parameters received from the source at step 310 may also indicate the identity of the secondary communication channel. Alternatively, the identity of the secondary communication channel may be encoded in memory at the safety apparatus and obtained automatically. In still another example, an ordered list of secondary communication channels may be maintained and the secondary communication channel selected from the list. For instance, if the first choice on the list is unavailable (after configuring the transmitter and attempting to transmit a message), then the second choice may be selected and so forth.

At step 314, the secondary communication channel is configured according to the received parameters. For example, a transmitter may be set to transmit according to a particular frequency range, power level, or other characteristic or combinations or characteristics.

At step 316, a message is transmitted via the configured secondary communication channel. For example, the message may be an emergency message indicating that the user at the safety apparatus needs assistance. Once the message is transmitted, the message is received at an external safety center and may be acted on either automatically at the external safety center and/or manually by personnel at the external safety center.

Thus, approaches for obtaining emergency assistance, for example, from a vehicle are provided. These approaches allow emergency assistance to be obtained regardless of the communication environment of the vehicle. The approaches described herein are self-configurable and act to automatically configure a transmitter to an appropriate communicate channel to use to obtain emergency assistance. In addition, these approaches are easy to use and increase the ability of the user to obtain emergency assistance regardless of the communication environment and regardless of the primary communication channel to an external safety center becoming disabled.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of sending a message from a vehicle to an emergency call center, the method comprising: determining that a vehicle air bag has deployed; when the vehicle air bag deployed, determining whether a first channel is communicatively coupled to a cellular communication network, the first communication channel configured to preferentially transmit emergency messages to the cellular communication network;

when the first communication channel is not communicatively coupled to the cellular communication network, attempting to transmit an emergency message from the vehicle to the emergency call center over at least one of a plurality of available secondary non-cellular communications channels used for communicating over a first of a plurality of different types of communication protocols over which transmission of the emergency message is attempted when the first channel is not coupled to the cellular network, the transmission of the emergency message from the vehicle via a secondary communication channel comprising:

receiving from an ordered list stored within the vehicle, at least one configuration parameter and an associated non-cellular modulation scheme to be used on a non-cellular frequency for a first secondary communications channel of said plurality of the different types of secondary non-cellular communication channels, the first secondary communication channel used for communicating over a first of the plurality of different types of communication protocols;

configuring the first secondary non-cellular communication channel on the ordered list using the at least one configuration parameter and the associated non-cellular modulation scheme to be used on a non-cellular frequency received for the first secondary communications channel;

attempting to transmit the emergency message from the vehicle to the emergency call center over the configured first secondary non-cellular communication channel, wherein, if the emergency message cannot be transmitted over the first secondary non-cellular communication channel to the emergency call center, receiving from the ordered list, at least one configuration parameter and an associated non-cellular modulation scheme to be used on a non-cellular frequency for a second secondary communications channel of said plurality of the different types of secondary non-cellular communication channels, the second secondary communication channel used for communicating over a second of the plurality of different types of communication protocols;

configuring the second secondary non-cellular communication channel on the ordered list using the at least one configuration parameter and the associated non-cellular modulation scheme to be used on a non-cellular frequency received for the second secondary communications channel;

attempting to transmit the emergency message from the vehicle to the emergency call center over the configured second secondary non-cellular communication channel; and, if the emergency message cannot be transmitted over the second secondary non-cellular communication channel to the emergency call center, repeating the steps above of receiving, configuring and attempting to transmit the emergency message for the other secondary non-cellular communication channels until the emergency message is transmitted to the emergency call center.

2. The method of claim 1 wherein the first communications channel is capable of being coupled to a first cellular communication network and wherein the second communications channel is capable of being coupled to a second cellular communication network.

3. The method of claim 1 wherein determining a first secondary communications channel comprises selecting an identity of a channel based upon a pre-determined choice.

4. An apparatus for transmitting emergency messages from a vehicle to an emergency call center, the apparatus comprising:

an interface for receiving an indication of whether a primary cellular communication channel is available with an emergency response system;

a transmitter configured to preferentially send emergency messages on the primary cellular communication channel to a cellular communication network and to send messages via a plurality of secondary non-cellular communication channels;

a controller coupled to the transmitter and coupled to a vehicle's safety system, the controller being configured to:

determine when an air bag of the vehicle's safety system has been deployed;

when the air bag has been deployed, determine when the primary communication channel is not available with the emergency response system;

when the primary channel is not available with the emergency response system, determine a first of a plurality of available secondary non-cellular communications channels used for communicating over a first of a plurality of different types of communication protocols over which transmission of the emergency message from the vehicle to the emergency call center is attempted;

receive at least one configuration parameter and an associated non-cellular modulation scheme to be used on a non-cellular frequency for the first, secondary non-cellular communication channel of said plurality of the different types of secondary non-cellular communication channels, the first secondary communication channel used for communicating over a first of the plurality of different types of communication protocols, from an ordered list stored at the vehicle;

the controller being additionally configured to cause an attempt of a transmission of the emergency message from the vehicle to the emergency call center over the configured first, secondary non-cellular communication channel, configured using the at least one configuration parameter and the associated non-cellular modulation scheme to be used on a non-cellular frequency and obtained from the ordered list;

responsive to failure of the transmission of the emergency message over the first secondary non-cellular communications channel to the emergency call center, receive from the ordered list, at least one configuration parameter and an associated non-cellular modulation scheme to be used on a non-cellular frequency for a second secondary communications channel of said plurality of the different types of secondary non-cellular communication channels, the second secondary communication channel used for communicating over a second of the plurality of different types of communication protocols:

configure the second secondary non-cellular communication channel on the ordered list using the at least one configuration parameter and the associated non-cellular modulation scheme to be used on a non-cellular frequency received for the second secondary communications channel;

attempt to transmit the emergency message from the vehicle to the emergency call center over the configured second secondary non-cellular communication channel; and, if the emergency message cannot be transmitted over the second secondary non-cellular communication channel to the emergency call center, repeat the steps above of receiving, configuring and attempting to transmit the emergency message for the other secondary non-cellular communication channels until the emergency message is transmitted to the emergency call center.

5. The apparatus of claim 4 further comprising a database, the database coupled to the controller, the database including an identity of each of the secondary non-cellular communication channels.

6. The apparatus of claim 4 wherein the at least one parameter is selected from a group comprising a data encoding, a data rate, and a signal strength.

7. The apparatus of claim 4 wherein the secondary non-cellular communication channel is selected from a group comprising; a non-cellular radio communication channel, a television communication channel, a wired communication channel, a satellite communication channel, or a non-cellular radio beacon communication channel.

* * * * *